United States Patent
Harada (10) Patent No.: US 8,459,000 B2
(45) Date of Patent: Jun. 11, 2013

(54) CABLE PROTECTION AND GUIDE APPARATUS

(75) Inventor: Mitsuhiro Harada, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/548,373

(22) Filed: Jul. 13, 2012

(65) Prior Publication Data

US 2013/0025252 A1     Jan. 31, 2013

(30) Foreign Application Priority Data

Jul. 25, 2011  (JP) .................................. 2011-161503

(51) Int. Cl.
 *F16G 13/16* (2006.01)
(52) U.S. Cl.
 USPC .................................. 59/78.1; 59/900; 248/51
(58) Field of Classification Search
 USPC .................................. 59/78.1, 900; 248/49, 51
 See application file for complete search history.

(56) References Cited

U.S. PATENT DOCUMENTS

| | | | | |
|---|---|---|---|---|
| 5,020,313 A | * | 6/1991 | Moritz et al. | 59/78.1 |
| 6,156,974 A | * | 12/2000 | Blase | 174/68.3 |
| 6,173,560 B1 | * | 1/2001 | Weber | 59/78.1 |
| 6,425,238 B1 | * | 7/2002 | Blase | 59/78.1 |
| 6,615,573 B2 | * | 9/2003 | Blase | 59/78.1 |
| 6,997,412 B2 | * | 2/2006 | Komiya | 242/615.2 |
| 7,343,731 B2 | * | 3/2008 | Iwami et al. | 59/78.1 |
| 7,526,910 B2 | * | 5/2009 | Komiya | 59/78.1 |

FOREIGN PATENT DOCUMENTS

JP    2010121736 A    6/2010

* cited by examiner

*Primary Examiner* — David B Jones
(74) *Attorney, Agent, or Firm* — Woodling, Krost and Rust (57) ABSTRACT

A cable protection and guide apparatus is configured to suppress collision noise otherwise generated between a peripheral member and link frames due to polygonal movements of the link frames. Wear and damage of the cables otherwise caused by contact with a connecting plate is prevented. The apparatus comprises a plurality of link frames each having a cable rectangularly-shaped, in cross-section, accommodating space formed by a pair of laterally and separately disposed link plates. Connecting plates crosslink the link plates on cable-bend inner and outer circumferential sides. Link frames are connected bendably with each other in a cable longitudinal direction between a cable stationary end and a cable mobile end to protect and guide the cables. The cable-bend outer circumferential side connecting plate is provided with cylindrical elastic members surrounding the connecting plate across the crosslinking direction thereof.

5 Claims, 9 Drawing Sheets

CABLE PROTECTION AND GUIDE APPARATUS

CROSS REFERENCE TO RELATED APPLICATIONS

This application claims the foreign priority benefit under Title 35, United States Code, §119 (a)-(d) of Japanese Patent Application No. 2011-161503, filed on, Jul. 25, 2011 in the Japan Patent Office, the disclosure of which is herein incorporated by reference in its entirety.

BACKGROUND OF THE INVENTION

1. Field of the Invention

The present invention relates to a cable protection and guide apparatus configured to be used for work machines, electronic apparatuses, construction machines, industrial robots, conveying machines and other machines. The cable protection and guide apparatus protects and guides flexible cables and hoses such as electrical cables, optical fibers and fluid supplying hoses. The cables and hoses transmit electrical signals, power, fluid, and/or air.

2. Related Art

Figure 12:
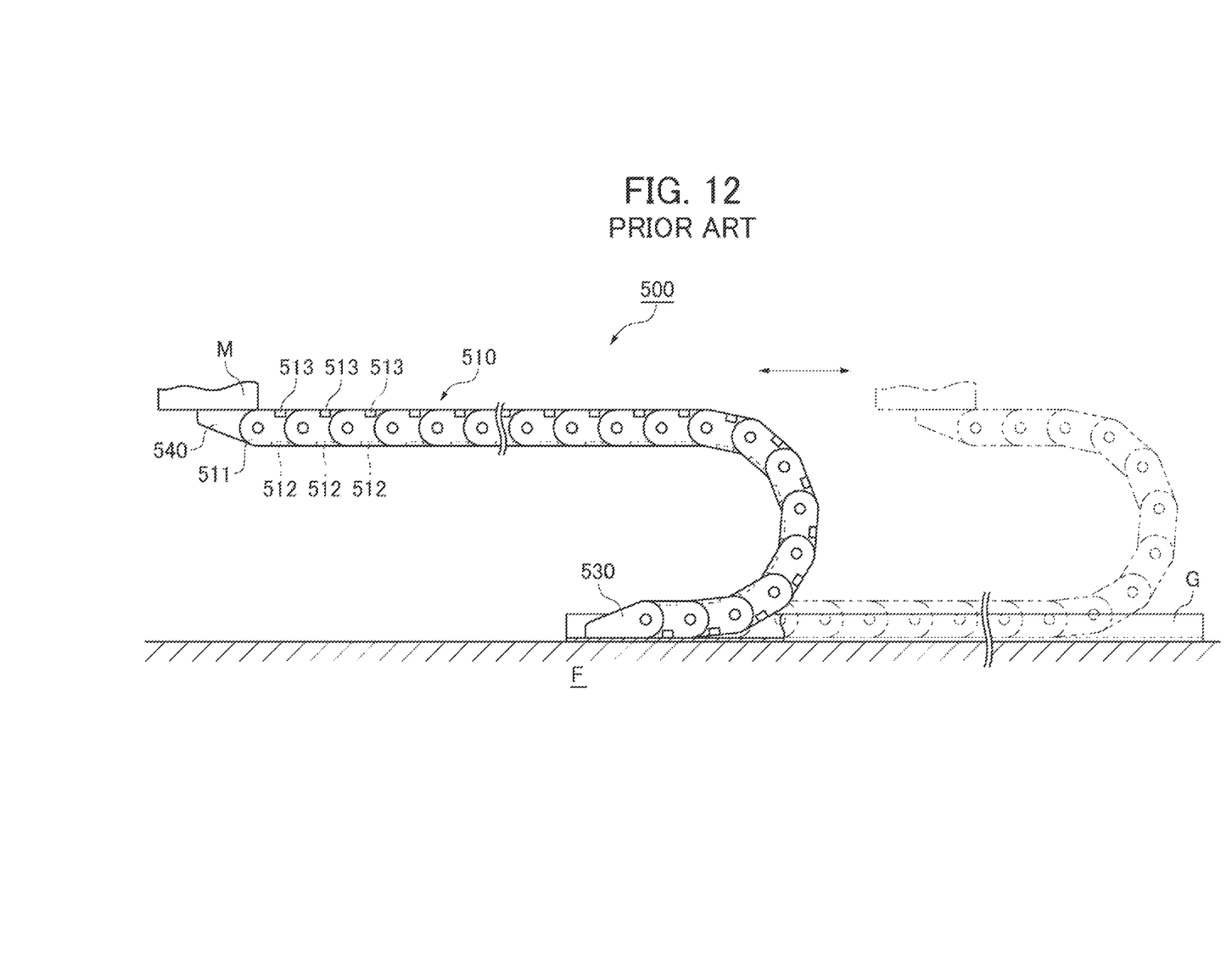
FIG. 12 is a front view of a prior art cable protection and guide apparatus.

As shown in FIG. 12, a prior art cable protection and guide apparatus (referred to appropriately as the "apparatus" hereinafter) 500 comprises a large number of link frames 510 bendably connected in a cable longitudinal direction between a stationary end bracket 530 fixed to a cable stationary end F and a mobile end bracket 540 provided at a cable mobile end M. Each link frame 510 is composed of a pair of lateral link plates 511 and connecting plates 512, 513 crosslinking the link plates 511 on inner and outer circumferential sides of bent cables (referred to as the "cable-bend inner or outer circumferential side" hereinafter). The apparatus 500 protects and guides the cables (not shown) which extend from the cable stationary end F to the cable mobile end M as disclosed in Japanese Patent Application Laid-open No. 2010-121736 (see Paragraph [0003], FIG. 13) for example.

However, the prior art apparatus 500 as described above has the following cumbersome problem. That is, because the apparatus 500 assumes a polygonal movement in which the link frames 510 draw a polygonal orbit when the apparatus 500 bends, the link plates 511 do not smoothly land on a guide rail G, thus generating a collision noise between the link frames 510 and the guide rail G when the cable mobile end M moves horizontally in a right direction in FIG. 12 for example.

The apparatus 500 described above also has the following problem. That is, if the cables are shifted in a cable longitudinal direction relatively to the link frames 510, the cables directly slidably-contact the connecting plate 513 on the cable-bend outer circumferential side, thus possibly generating a slidable-contact noise between the cables and the cable-bend outer circumferential side connecting plate 513. This causes wear and damages the cables.

Accordingly, there is a need for a cable protection and guide apparatus configured to suppress such collision noise generated on the cable-bend outer circumferential side between a peripheral member and link frames due to the polygonal movement of the link frames and to suppress wear and damage of the cables caused by the contact with the cable-bend outer circumferential side connecting plate.

SUMMARY OF THE INVENTION

According to a first aspect of the invention, there is provided a cable protection and guide apparatus comprising a plurality of link frames. Each link frame has a rectangularly-shaped, in cross-section, cable accommodating space which is formed by a pair of laterally and separately disposed link plates and cable-bend inner side and cable-bend outer circumferential side connecting plates, respectively. The connecting plates crosslink the link plates on the cable-bend inner and outer circumferential sides, respectively. The cable has a stationary end and a cable mobile end. Each of the plurality of link frames is connected bendably with another link plate in a cable longitudinal direction between the cable stationary end and the cable mobile end to protect and guide the cables. Each cable-bend outer circumferential side connecting plate is provided with cylindrical elastic members surrounding the connecting plate in the crosslinking direction thereof.

The pairs of laterally and separately disposed link plates include right and left spaced link plates articulately connected to each other in a longitudinal direction enabling said link plates to form a flexional circumferential bend having a flexional inner circumferential side (cable-bend inner circumferential side) and a flexional outer circumferential side (cable-bend outer circumferential side). Each of the left and right link plates includes a flexional inner circumferential side residing during bending on the flexional inner circumferential side (cable-bend inner circumferential side) of the bend. Each of the left and right link plates includes a flexional outer circumferential side (cable-bend outer circumferential side) residing during bending on the outer flexional circumferential side of the bend. Bending of the cable protection and guide apparatus is necessary as one side of the apparatus is fixed and the other side of the apparatus is mobile and must be able to move longitudinally back and forth. Bending enables the cable protection and guide apparatus to move.

According to a second aspect of the invention, the cylindrical elastic members are fitted loosely around and are rotatably centered on the cable-bend outer circumferential side connecting plate.

According to a third aspect of the invention, the link frame further includes vertical partitions that divide the cable accommodating space. The vertical partitions engage with the cable-bend inner circumferential side connecting plate and the cable-bend outer circumferential side connecting plate. The cylindrical elastic members are positioned around the he cable-bend outer circumferential side connecting plate such that the cylindrical elastic members nip and position the vertical partitions.

According to a fourth aspect of the invention, the cable-bend inner circumferential side connecting plate is provided with cylindrical elastic members that surround the connecting plate in the crosslinking direction thereof.

Effects of the Invention

The cable protection and guide apparatus of the invention includes the plurality of link frames. Each of the link frames includes a rectangularly shaped, in cross-section, cable accommodating space which is formed by the pair of laterally and separately disposed link plates and the cable-bend inner and outer circumferential side connecting plates, respectively.

The cable-bend inner and outer circumferential side connecting plates crosslink the link plates on the cable-bend inner and outer circumferential sides. The cable protection and guide apparatus includes the cable stationary end and the cable mobile end. Each link frame of the plurality of link frames is connected bendably with another link frame in the cable longitudinal direction between the cable stationary end and the cable mobile end to protect and guide the cables. The cable protection and guide apparatus accommodates the cables within the cable accommodating space and protects and guides the cables bendably. The invention brings about the following peculiar effects.

According to the first aspect of the apparatus of the invention each cable-bend outer circumferential side connecting plate is provided with cylindrical elastic members surrounding the connecting plate across the crosslinking direction thereof. The cylindrical elastic members deform elastically in a condition sandwiched between the cable-bend outer circumferential side connecting plate and a peripheral member such as a guide rail. The guide rail is attached to the fixed portion of the machine. The cylindrical elastic members contact the peripheral member (guide rail) when the link frames shift from a bend posture to a straight posture. The cylindrical elastic members enable the link frames to softly contact the guide rail and suppress the collision noise that would be generated on the cable-bend outer circumferential side due to the polygonal movement of the link frames.

According to the second aspect of the apparatus of the invention the cylindrical elastic members are fitted loosely around and rotatably centered on the cable-bend outer circumferential side connecting plate. The cylindrical elastic members are in rolling contact with the cables that move horizontally in the cable longitudinal direction. The cables do not contact the cable-bend outer circumferential side connecting plate.

Therefore, wear and damage of the cables otherwise caused in sliding the cables over the cable-bend outer circumferential side connecting plate is avoided.

The cylindrical elastic members buffer and prevent the cables from colliding against the cable-bend outer circumferential side connecting plate. The cylindrical elastic members receive the cables and elastically deform and sink in a gap between the cables and the cable-bend outer circumferential side connecting plate.

The cylindrical elastic members are deformed by the cables when the cables move vertically from the cable-bend inner circumferential side to the cable-bend outer circumferential side within the cable accommodating space.

Therefore, the cylindrical elastic members can reduce the collision noise otherwise generated when the cables collide against the cable-bend outer circumferential side connecting plate.

According to the third aspect of the apparatus of the invention, the link frame further includes vertical partitions that divide the cable accommodating space. The vertical partitions engage the cable-bend inner circumferential side connecting plate and the cable-bend outer circumferential side connecting plate. The cylindrical elastic members are disposed across the crosslinking direction of the cable-bend outer circumferential side connecting plate such that the cylindrical elastic members nip and position the vertical partitions. The cylindrical elastic members nip and securely position the vertical partitions from the right and left in the crosslinking direction of the cable-bend outer circumferential side connecting plate. The vertical partitions sort the cables orderly at predetermined positions and prevent the cables from being entangled by preventing the vertical partitions from falling down or falling out even when the cables collide against the vertical partitions.

According to the fourth aspect of the apparatus of the invention, the cable-bend inner circumferential side connecting plate is provided with cylindrical elastic members that surround the connecting plate in the crosslinking direction thereof. The cylindrical elastic members engage and deform elastically with each other and moderate the bending operation of the link frames by resisting the bending operation of the link frames. When a projection formed on one link plate among the neighboring link plates engages a cutaway portion formed on another link plate and abuts a side wall of the cutaway portion, the bending angle of both link plates is restricted.

Accordingly, collision noise is reduced which would otherwise be generated when the projection collides against the side wall of the cutaway portion.

Further features of the present invention will become apparent from the following description of exemplary embodiments with reference to the attached drawings.

PREFERRED EMBODIMENT OF THE INVENTION (First Embodiment)

A first embodiment of a cable protection and guide apparatus of the invention will be explained with reference to FIGS. 1 through 7A and 7B.

Figure 1:
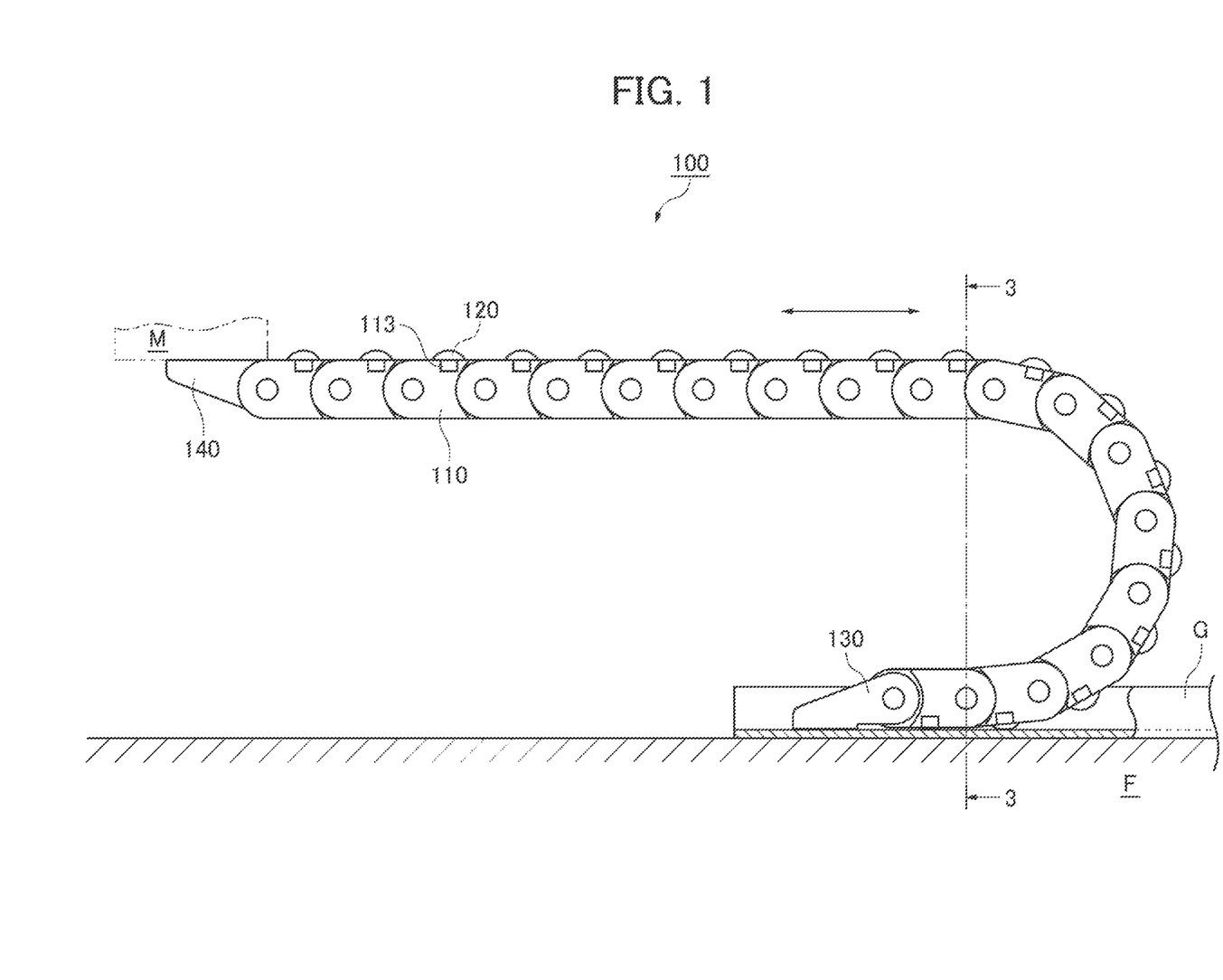
FIG. 1 is a front view of a cable protection and guide apparatus of a first embodiment of the invention.
Figure 2:
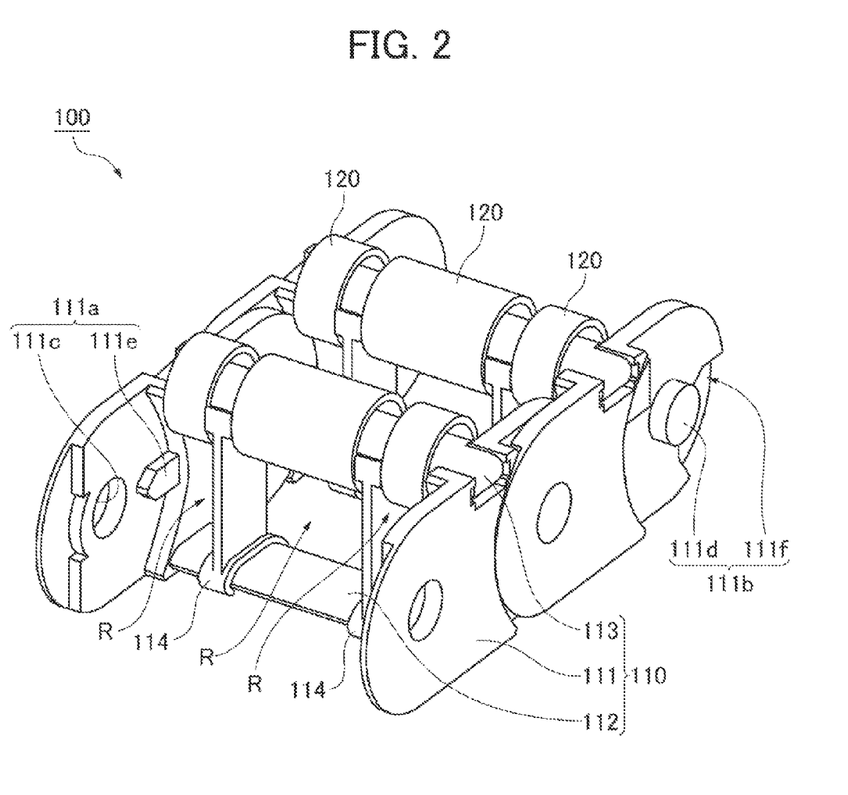
FIG. 2 is a perspective view showing link frames and cylindrical elastic members of the apparatus shown in FIG. 1.
Figure 3:
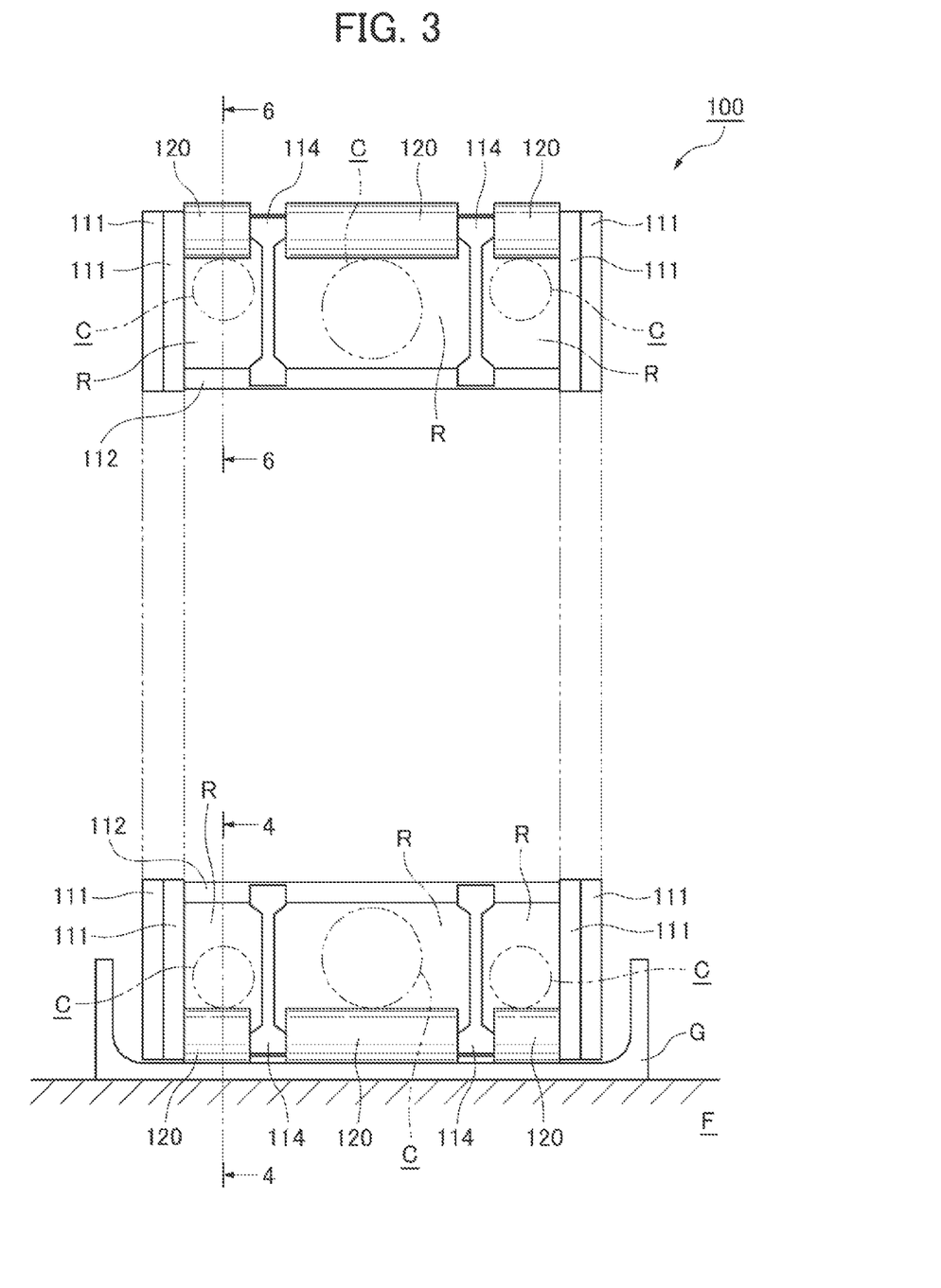
FIG. 3 is a cross-sectional view of the apparatus shown in FIG. 1 taken along the lines 3-3 of FIG. 1.
Figure 4:
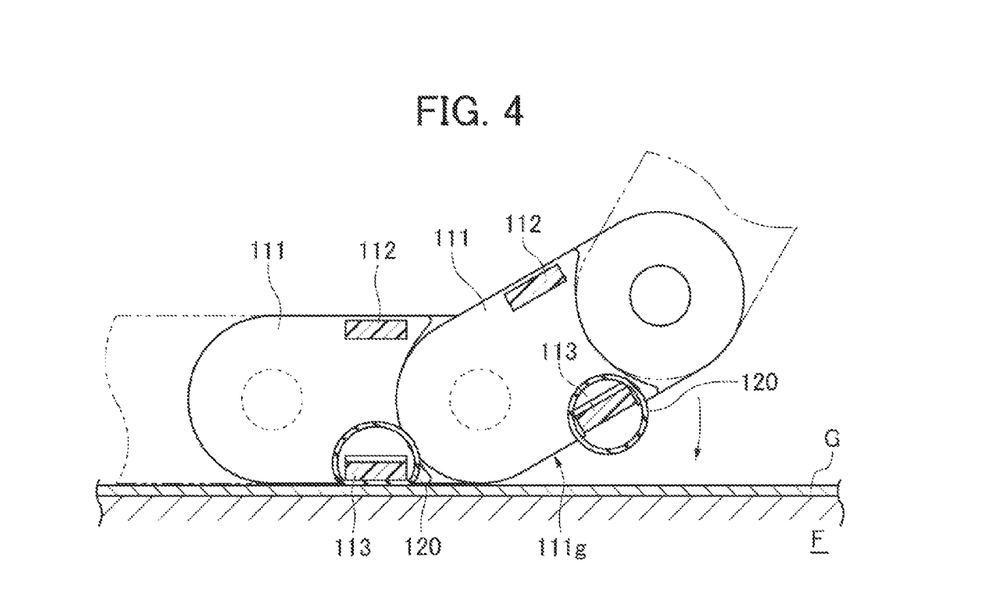
FIG. 4 is a cross-sectional view illustrating a state before the link frame including the cylindrical elastic member indicated by a line 4-4 in FIG. 3 contacts a guide rail.
Figure 5:
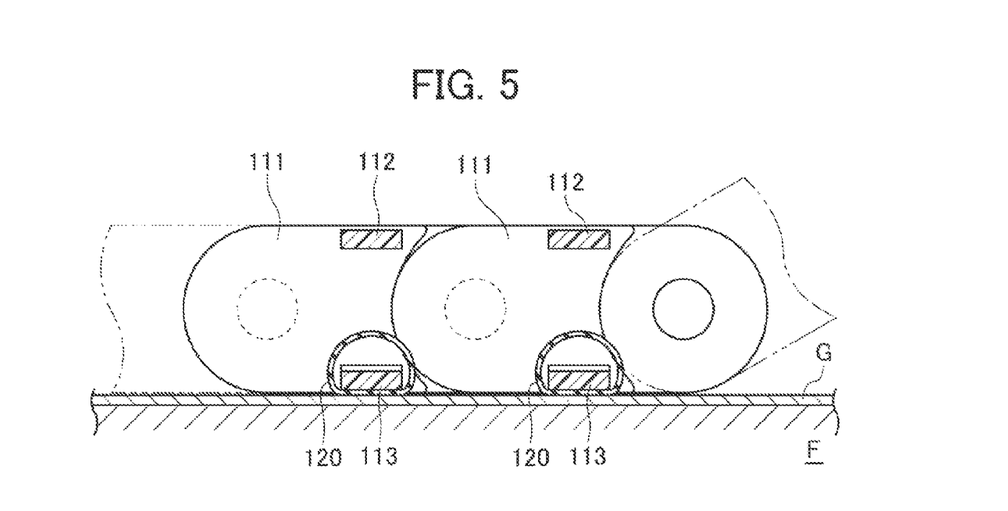
FIG. 5 is a section view illustrating a state after the cylindrical elastic member in FIG. 4 contacts the guide rail.
Figure 6:
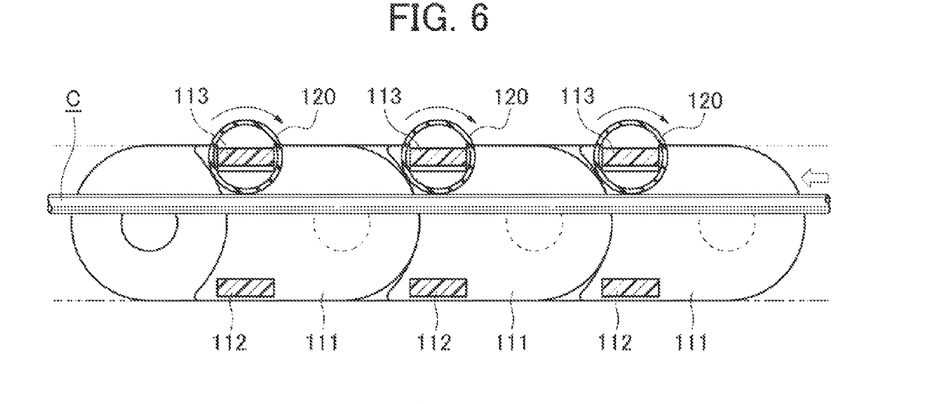
FIG. 6 is a section view in which the cylindrical elastic members in the link frames indicated by a line 6-6 in FIG. 3 rotatably contact with the cables.
Figure 7A:
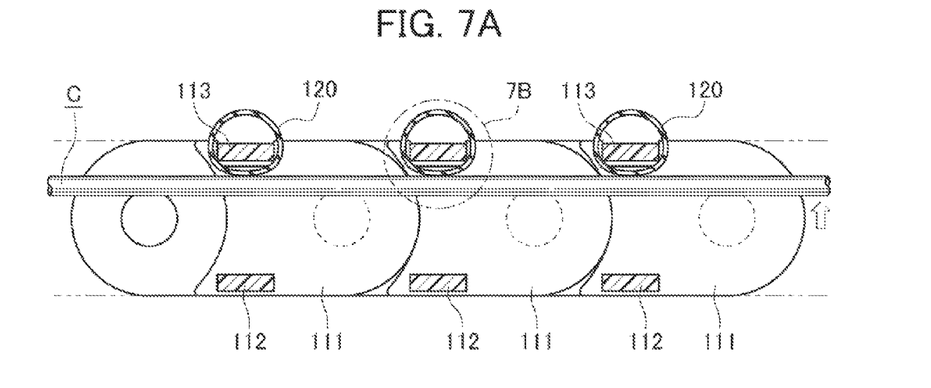
FIG. 7A is a section view illustrating a state in which the cylindrical elastic members in the link frames indicated by the line 6-6 in FIG. 3 elastically deformed by the cable and FIG. 7B is an enlarged view of the cylindrical elastic member elastically deformed by the cable.
Figure 7B:
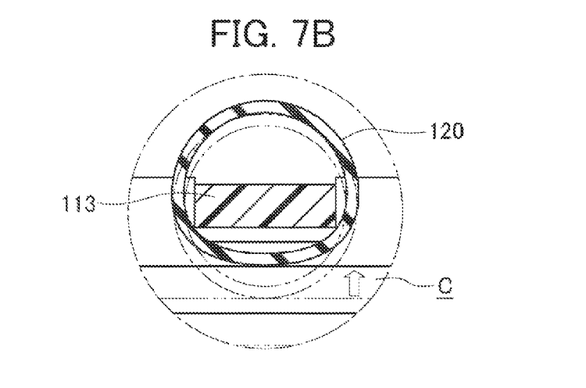

FIG. 1 is a front view of a cable protection and guide apparatus of the first embodiment of the invention. FIG. 2 is a perspective view showing link frames and cylindrical elastic members of the apparatus shown in FIG. 1. FIG. 3 is a cross-sectional view of the apparatus shown in FIG. 1 taken along the lines 3-3. FIG. 4 is a section view illustrating a state before the link frame including the cylindrical elastic member indicated by a line 4-4 in FIG. 3 contacts a guide rail. FIG. 5 is a section view illustrating a state after the cylindrical elastic member in FIG. 4 contacts the guide rail. FIG. 6 is a section view in which the cylindrical elastic members in the link frames indicated by a line 6-6 in FIG. 3 rotatably contact the cables. FIG. 7A is a section view illustrating a state in which the cylindrical elastic members in the link frames indicated by the line 6-6 in FIG. 3 are elastically deformed by the cable. FIG. 7B is an enlarged view of the cylindrical elastic member elastically deformed by the cable.

The cable protection and guide apparatus 100 of the present embodiment is used to protect and guide cables. The cables may be electrical cables for transmitting electrical signals or for supplying power. Instead of cables, hoses for supplying pressurized fluid or air, connected between a cable stationary end and a cable mobile end may be used.

As shown in FIGS. 1 and 2, the apparatus 100 comprises a large number (a plurality) of link frames 110 each having a rectangularly-shaped, in cross-section, cable accommodating space formed by a pair of laterally and separately disposed link plates 111 and connecting plates 112, 113 crosslinking the link plates 111 on cable-bend inner and outer circumferential sides. The large number (a plurality) of link frames 110 are connected bendably with each other in a cable longitudinal direction between a stationary end bracket 130 fixed to a cable stationary end F and a mobile end bracket 140 provided at a cable mobile end M to protect and guide the cables C.

It is noted that although the link frame 110 is molded by using glass fiber reinforced polyamide resin that exhibits excellent strength in the present embodiment, the link frame 110 may be formed of polyester resin or polyacetal resin.

It is also noted a guide rail G in FIG. 1 is laid on the cable stationary end F and linearly guides and supports the link frames 110.

As shown in FIG. 1, the large number of link frames 110 (a plurality) are connected in a longitudinal direction between the cable stationary end F and the cable mobile end M. A portion of the link frames of the cable protection and guide apparatus assume a straight posture and another portion of the link frames assume a bending posture depending on the movement of the apparatus between the cable stationary end F and the cable mobile end M.

As shown in FIG. 2, the link plates 111 described above have front link portions 111a and rear link portions 111b that are about half the thickness of the central portion of the plates.

As shown also in FIG. 2, the front connecting portion 111a of the link plate 111 is provided with a connecting pin hole 111c and the rear connecting portion 111b of the link plate 111 is provided with a connecting pin 111d that fits into the connecting pin hole 111c.

The successively disposed link frames 110 are connected bendably with another adjacent link frame by fitting the connecting pin hole 111c of the succeeding link frame 110 with the connecting pin 111d of the preceding link frame 110.

As shown in FIG. 2, the front connecting portion 111a of the link plate 111 is provided with a projection 111e and the rear connecting portion 111b of the link plate 111 is provided with a cutaway portion 111f that engages with the projection 111e.

The bending angle of the link frames 110 is restricted by engaging the projection 111e of the succeeding link frame 110 with the cutaway portion 111f of the preceding link frame 110.

As shown in FIG. 3, vertical partitions 114 are provided attachably between the cable-bend inner circumferential side connecting plate 112 and the cable-bend outer circumferential side connecting plate 113 to sort the cables C within cable accommodating spaces R between the pair of link plates 111. The vertical partitions are attached to the connecting plates 112, 113.

Next, a specific configuration of cylindrical elastic members 120, i.e., the most characteristic part of the apparatus 100 of the present embodiment, will be explained with reference to the drawings.

As shown in FIG. 2, the cable-bend outer circumferential side connecting plate 113 is provided with the cylindrical elastic members 120 surrounding the connecting plate 113 across the crosslinking direction thereof.

The cylindrical elastic members 120 are molded of thermo-hardening elastomer.

Thereby, the cylindrical elastic members 120 deform elastically in a condition sandwiched between the cable-bend outer circumferential side connecting plate 113 and the guide rail G as the cylindrical elastic members 120 contact the guide rail G. See FIGS. 4 and 5 wherein the bending position and the straight position are illustrated.

It is noted that although the thermo-hardening elastomer is adopted for the cylindrical elastic member 120 in the present embodiment, the cylindrical elastic member 120 may be any elastomer as long as it exhibits wear-resistance and elasticity.

As shown in FIG. 3, the cylindrical elastic members 120 described above are disposed across the crosslinking direction of the cable-bend outer circumferential side connecting plate 113 such that the cylindrical elastic members 120 nip and position the two vertical partitions 114 that divide the cable accommodating spaces R. The two vertical partitions 114 engage the cable-bend inner circumferential side connecting plate 112 and the cable-bend outer circumferential side connecting plate 113.

With this arrangement, the cylindrical elastic members 120 nip and securely position the vertical partitions 114 from the right and left sides in the crosslinking direction of the cable-bend outer circumferential side connecting plate 113, sort the cables C orderly at predetermined positions and prevent the cables C from being entangled. The cylindrical elastic members prevent the vertical partitions 114 from falling down or falling out even when the cables C collide with the vertical partitions 114.

As shown in FIGS. 6, 7A and 7B, the cylindrical elastic members 120 are fitted around the cable-bend outer circumferential side connecting plate 113.

With this arrangement, as shown in FIG. 6 for example, the cylindrical elastic members 120 are in rolling contact with cables C that move horizontally in the left direction in FIG. 6 by turning clockwise centering on the cable-bend outer circumferential side connecting plate 113. The cables C do not directly contact the cable-bend outer circumferential side connecting plate 113. As shown in FIGS. 7A and 7B, the cylindrical elastic members 120 buffer and prevent the cables C from colliding against the cable-bend outer circumferential side connecting plate 113. The cylindrical elastic members 120 elastically deform and sink in a gap between the cables C and the cable-bend outer circumferential side connecting plate 113. The cables C move vertically from the cable-bend inner circumferential side to the cable-bend outer circumferential side, i.e., in an upward direction in FIGS. 7A and 7B.

The apparatus 100 of the present embodiment thus obtained is capable of suppressing the collision noise that is otherwise prone to be generated on the cable-bend outer circumferential side when the link frames 110 collide against the guide rail G due to the polygonal movement of the link frames 110. By polygonal movement it is meant that a portion of the link frames bend as the mobile end of the cable protection and guide apparatus moves longitudinally. The link frames form a polygon during bending as the link frames have a straight cable-bend inner circumferential side and a straight cable-bend outer circumferential side. The cable-bend outer circumferential side connecting plate 113 is provided with the cylindrical elastic members 120 surrounding the cable-bend outer circumferential side connecting plate 113 across the crosslinking direction thereof and the cylindrical elastic members 120 cause the link frames 110 to softly contact guide rail G.

The cylindrical elastic members 120 are fitted loosely around and are rotatably centered around the cable-bend outer circumferential side connecting plate 113. Wear and damage of the cables C that are otherwise caused by sliding against the cable-bend outer circumferential side connecting plate 113 is prevented. Cable C life is prolonged. The cylindrical elastic members 120 can also reduce the noise otherwise generated when the cable-bend outer circumferential side connecting plate 113 collides against the cables C. Thus, the advantageous effects of the cylindrical elastic members are remarkable.

(Second Embodiment)

A second embodiment of a cable protection and guide apparatus 200 of the invention will be explained with reference to FIGS. 8 through 11.

Figure 8:
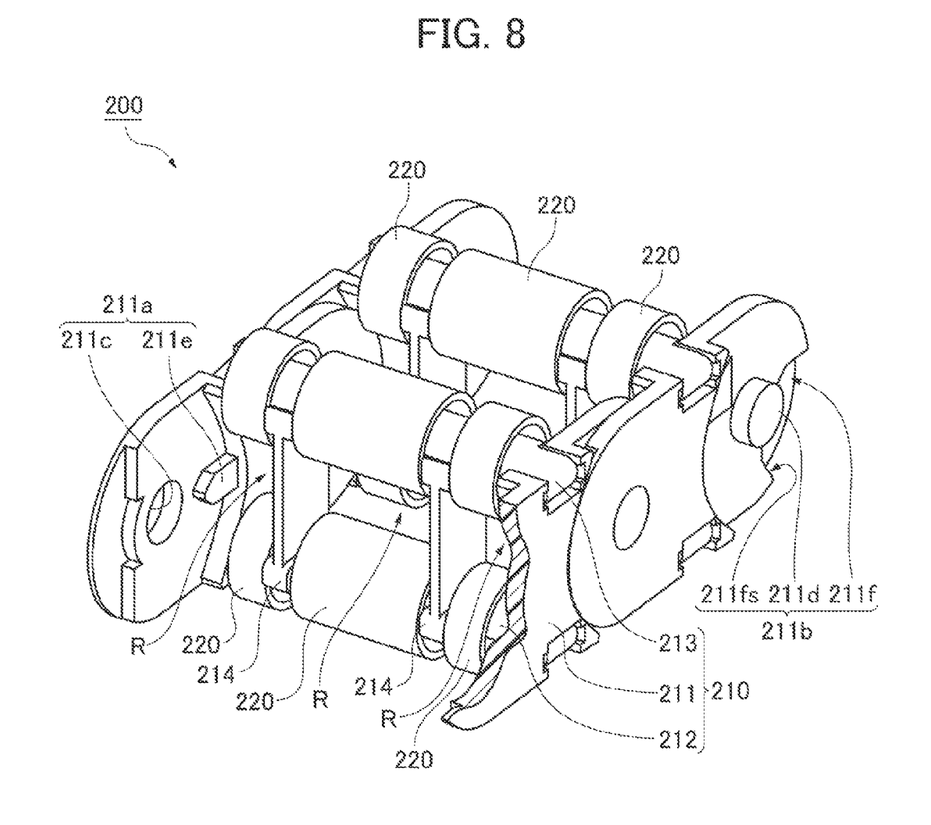
FIG. 8 is a perspective view showing link frames for use in a cable protection and guide apparatus of a second embodiment of the invention.
Figure 9:
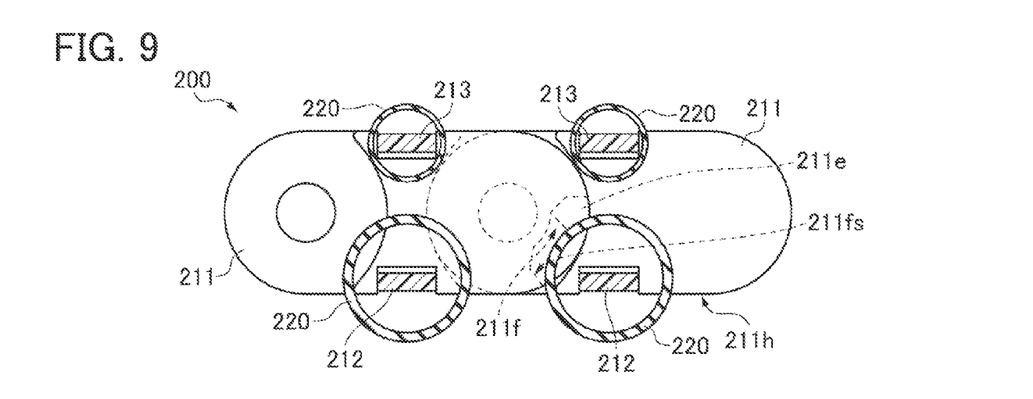
FIG. 9 is a section view illustrating a state before the link frames in FIG. 8 are bent.
Figure 10:
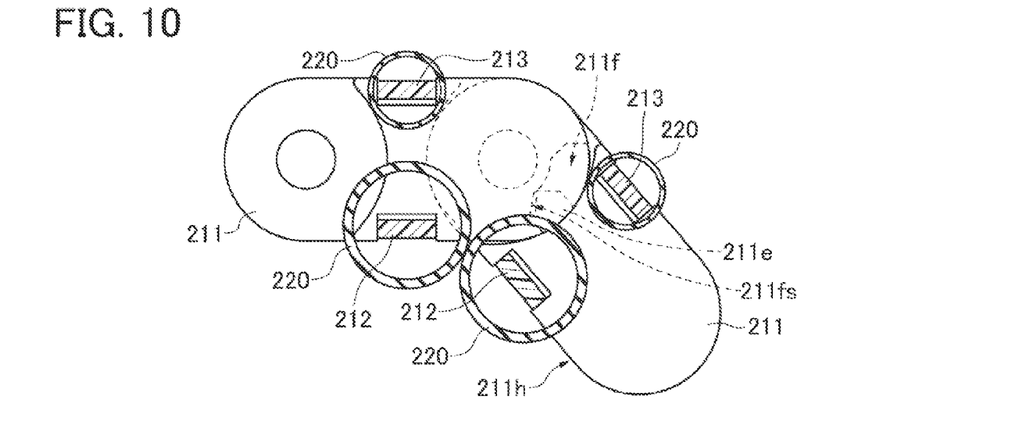
FIG. 10 is a section view illustrating a state in which the link frames in FIG. 9 are bent so that the cylindrical elastic members contact each other.
Figure 11:
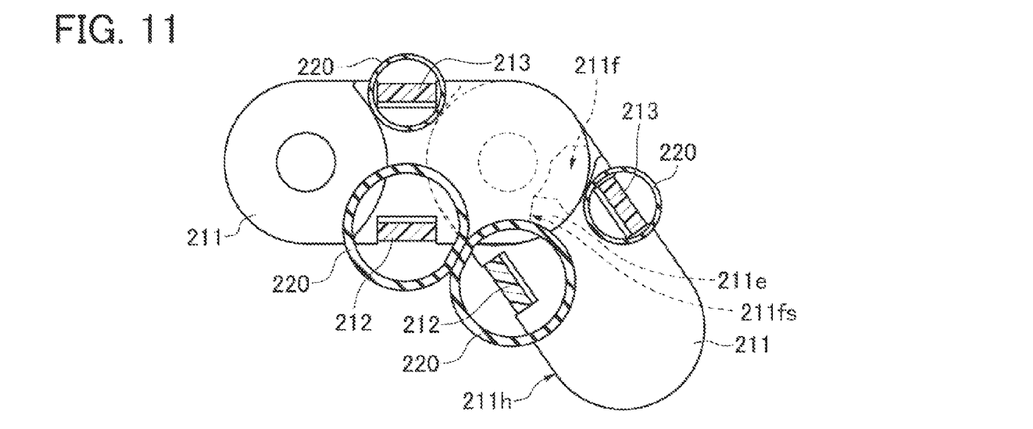
FIG. 11 is a section view illustrating a state in which the link frames in FIG. 10 are bent further so that a projection abuts a side wall of a cutaway portion.

FIG. 8 is a perspective view showing link frames for use in a cable protection and guide apparatus of the second embodiment of the invention. FIG. 9 is a section view illustrating a state before the link frames in FIG. 8 are bent. FIG. 10 is a section view illustrating a state in which the link frames in FIG. 9 are bent so that the cylindrical elastic members contact each other. FIG. 11 is a section view illustrating a state in which the link frames in FIG. 10 are bent further so that a projection abuts a side wall of a cutaway portion.

As shown in FIG. 8, as compared to the apparatus 100 of the first embodiment described above, the apparatus 200 of the second embodiment of the invention is different in that the cylindrical elastic members are also mounted around the connecting plate 212 on the circumferential inner bend. Some components of this second embodiment are basically the same, so that members identical or corresponding to the members of the apparatus 100 of the first embodiment described above will be denoted by corresponding reference numerals in the 200s and an overlapped or duplicative explanation thereof will be omitted here.

As shown in FIG. 8, a cable-bend inner circumferential side connecting plate 212 is provided with cylindrical elastic members 220 that surround the connecting plate 212 in the crosslinking direction thereof.

Specific operations of the cylindrical elastic members 220 when the link frames 210 are bent will be explained below with reference to FIGS. 9 through 11.

Figure 13:
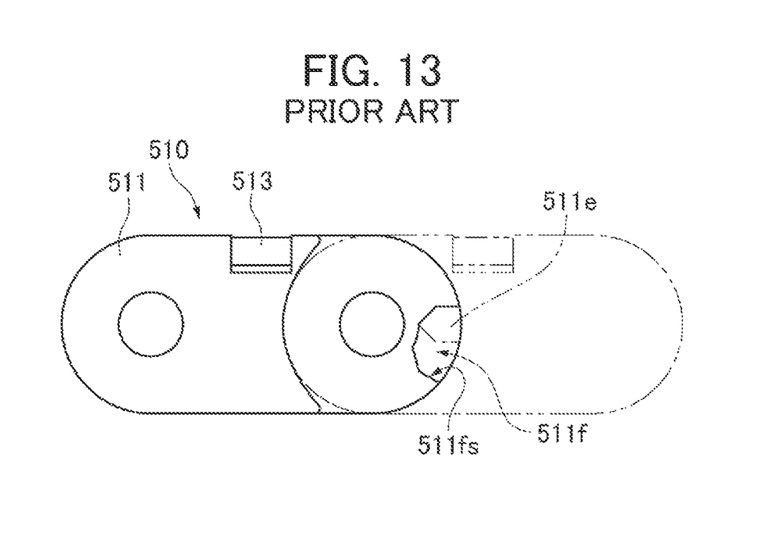
FIG. 13 is a diagram showing a state before the link frames in the prior art apparatus are bent.
Figure 14:
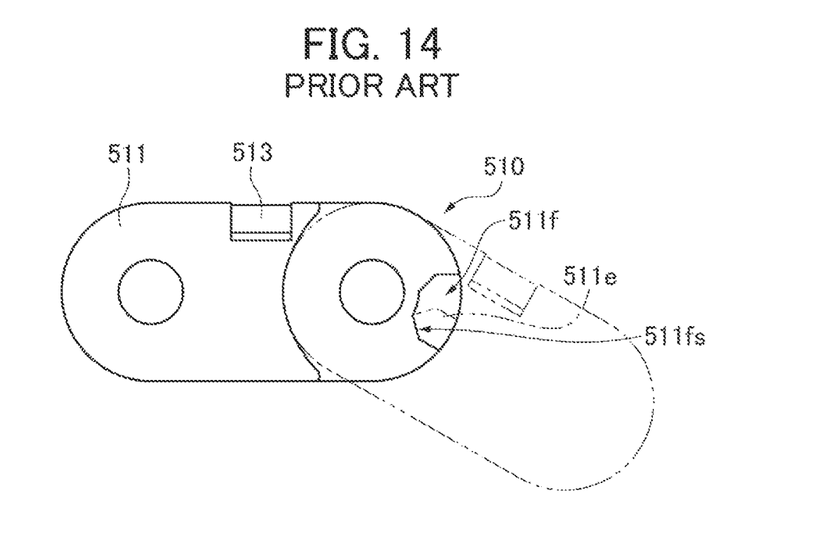
FIG. 14 is a diagram showing a state after the link frames in the prior art apparatus are bent.

As shown in FIGS. 13 and 14, the projection 511e engages with the cutaway portion 511f when the link frames 510 used in the prior art apparatus 500 bend and finish the bending operation when the projection 511e abuts a side wall 511fs of the cutaway portion 511f of the link frames 510.

In contrast, the cylindrical elastic members 220 provided respectively on the cable-bend inner circumferential side of the link frames 210 neighboring each other and extending out of a side edge 211h on the cable-bend inner circumferential side of the link plates 211 restrict each other before projection 211e abuts side wall 211fs of a cutaway portion 211f when the link frames 210 used in the apparatus 200 of the present embodiment are bent as shown in FIG. 10.

After that, the link frames 210 continue to bend until projection 211e abuts side wall 211fs of cutaway portion 211f while elastically deforming the cylindrical elastic members 220 finishing the bending operation as shown in FIG. 11.

The apparatus 200 of the present embodiment thus obtained brings about not only the same effect with that of the apparatus 100 of the first embodiment described above but also the following effect. That is, prior to the state in which the projection 211e of one link plate 211 among the neighboring link plates 211 engages with the cutaway portion 211f of the other link plate 211 and the projection 211e abuts the side wall 211fs of the cutaway portion 211f, thus restricting the bending angle of the both link plates 211, the cylindrical elastic members 220 succeeding in the cable longitudinal direction deform elastically with each other and moderate the bending operation of the link frames 210 by providing resistance to the bending operation of the link frames 210.

Accordingly, it is possible to reduce the collision noise otherwise generated when the projection 211e collides against the side wall 211fs of the cutaway portion 211f. Thus, the advantageous effects of the second embodiment are remarkable.

The specific mode of the cable protection and guide apparatus of the present invention may take any mode as long as the apparatus comprises the plurality of link frames each having the rectangularly-shaped, in cross-section, cable accommodating space. The rectangularly-shaped, in cross-section, cable accommodating space is formed by a pair of laterally and separately disposed link plates and the cable-bend inner and outer circumferential side connecting plates, respectively. The cable-bend inner and outer circumferential side connecting plate crosslink the link plates on the cable-bend inner and outer circumferential sides. The plurality of link frames is connected bendably with each other in the cable longitudinal direction between the cable stationary end and the cable mobile end to protect and guide the cables. Each cable-bend outer circumferential side connecting plate is provided with the cylindrical elastic members surrounding the connecting plate across the crosslinking direction thereof. The cylindrical elastic members suppress the collision noise that is otherwise prone to be generated on the cable-bend outer circumferential side due to the polygonal movement of the link frames. Additionally, the cylindrical elastic members suppress the slidable-contact noise made by the cables C otherwise caused by the contact between the cables and the cable-bend outer circumferential side connecting plate.

For instance, the link frame of the apparatus of the invention may be configured so that the link frame has the rectangular frame in cross-section by crosslinking the cable-bend inner and outer circumferential side connecting plates across the lateral pair of link plates and so that at least the cable-bend outer circumferential side connecting plate is engageable with the pair of link plates.

The cylindrical elastic members of the apparatus of the invention may be formed of any elastomer as long as it has elastically deforming characteristics. Thermo-hardening elastomer such as urethane rubber and fluororubber is preferable because they exhibit excellent wear resistance and high-elasticity.

Still further, it is more preferable to use polyester thermoplastic elastomer because temperature dependency of modulus of elasticity of the elastomer is low and a variation width of the modulus of elasticity is small when the ambient temperature is low and high.

The invention claimed is:
1. A cable protection and guide apparatus, comprising:
a cable stationary end;
a cable mobile end;
a plurality of link frames;

each said link frame has a rectangularly-shaped, in cross-section, cable accommodating space;

each said link frame includes a pair of laterally spaced and separately disposed link plates;

each of said link frames includes a cable-bend inner side connecting plate and a cable-bend outer side connecting plate;

said rectangularly-shaped, in cross-section, cable accommodating space of the link frame is formed: by a pair of laterally and separately disposed link plates; and, by said cable-bend inner side connecting plate and said cable-bend outer side connecting plate;

each said pair of laterally and separately disposed link plates includes a left link plate and a right link plate;

each said left link plate and each said right link plate includes a cable-bend inner circumferential side and a cable-bend outer circumferential side;

said cable-bend inner side connecting plate and said cable-bend outer side connecting plate of each said link frame crosslink said right and left link plates of each said pair of link plates of each said link frame;

each of said plurality of link frames is connected bendably with another of said plurality of link frames in a cable longitudinal direction between said cable stationary and said cable mobile end to protect and guide said cables;

each of said link frames includes a cylindrical elastic member;

said cylindrical elastic member surrounds said cable-bend outer circumferential side connecting plate of each of said link frames.

2. The cable protection and guide apparatus according to claim 1, wherein a plurality of cylindrical elastic members surround said cable-bend outer circumferential side connecting plate of each of said link frames.

3. The cable protection and guide apparatus according to claim 2 wherein said plurality of cylindrical elastic members surround said cable-bend outer circumferential side connecting plate loosely and rotatably.

4. The cable protection and guide apparatus according to claim 1, further comprising:

said link frame further includes a vertical partition that divides the rectangularly-shaped, in cross-section, cable accommodating space;

said vertical partition engages said cable-bend inner circumferential side connecting plate and said cable-bend outer circumferential side connecting plate;

a plurality of cylindrical elastic members;

said plurality of said cylindrical elastic members are disposed across a crosslinking direction of said cable-bend outer circumferential side connecting plate; and, said cylindrical elastic members nip and position said vertical partitions.

5. The cable protection and guide apparatus according to claim 4, wherein said cable-bend inner circumferential side connecting plate is provided with cylindrical elastic members that surround said connecting plate in the crosslinking direction thereof.

* * * * *